United States Patent
Lu

(10) Patent No.: US 12,158,858 B2
(45) Date of Patent: Dec. 3, 2024

(54) RESOURCE ALLOCATION METHOD AND DEVICE FOR PCIe CARD

(71) Applicant: INSPUR SUZHOU INTELLIGENT TECHNOLOGY CO., LTD., Suzhou (CN)

(72) Inventor: Lirong Lu, Suzhou (CN)

(73) Assignee: INSPUR SUZHOU INTELLIGENT TECHNOLOGY CO., LTD., Jiangsu (CN)

(*) Notice: Subject to any disclaimer, the term of this patent is extended or adjusted under 35 U.S.C. 154(b) by 0 days.

(21) Appl. No.: 17/926,409

(22) PCT Filed: Jan. 25, 2021

(86) PCT No.: PCT/CN2021/073479
§ 371 (c)(1),
(2) Date: Nov. 18, 2022

(87) PCT Pub. No.: WO2021/238269
PCT Pub. Date: Dec. 2, 2021

(65) Prior Publication Data
US 2023/0195676 A1    Jun. 22, 2023

(30) Foreign Application Priority Data
May 29, 2020  (CN) .................. 202010473175.X

(51) Int. Cl.
*G06F 13/42*    (2006.01)
*G06F 9/50*    (2006.01)

(52) U.S. Cl.
CPC ........ *G06F 13/4282* (2013.01); *G06F 9/5011* (2013.01); *G06F 2213/0026* (2013.01)

(58) Field of Classification Search
CPC .................................................. G06F 13/4282
See application file for complete search history.

(56) References Cited

U.S. PATENT DOCUMENTS 11,194,752 B2* 12/2021 Koh ..................... H05K 5/026
2006/0041701 A1   2/2006 Lin
(Continued)

FOREIGN PATENT DOCUMENTS

| CN | 103064773 A | 4/2013 |
| CN | 105302755 A | 2/2016 |

(Continued)

OTHER PUBLICATIONS

International Search report for PCT/CN2021/073479 mailed on Apr. 15, 2021.
(Continued)

*Primary Examiner* — Henry Tsai
*Assistant Examiner* — Juanito C Borromeo
(74) *Attorney, Agent, or Firm* — Dennemeyer & Associates LLC; Victoria Friedman

(57) ABSTRACT

Disclosed are a resource allocation method and device for a PCIe card. The method includes: allocation types of the PCIe card is divided according to the number of lanes of the PCIe card, and the allocation types and corresponding voltage intervals are numbered; a voltage of the PCIe card is detected in response to the PCIe card being connected to a mainboard; the voltage is compared with the voltage intervals and it is judged in which voltage interval of the numbered corresponding voltage intervals the voltage is located; and the mainboard invokes the PCIe allocation type corresponding to the voltage interval for allocation.

18 Claims, 2 Drawing Sheets

(56) References Cited

U.S. PATENT DOCUMENTS

2013/0346665 A1    12/2013   Freking et al.
2018/0239696 A1     8/2018   Lim et al.

FOREIGN PATENT DOCUMENTS

| | | |
|---|---|---|
| CN | 106303759 A | 1/2017 |
| CN | 107357705 A | 11/2017 |
| CN | 108459827 A | 8/2018 |
| CN | 109032993 A | 12/2018 |
| CN | 109542801 A | 3/2019 |
| CN | 109643297 A | 4/2019 |
| CN | 110046118 A | 7/2019 |
| CN | 110088709 A | 8/2019 |
| CN | 209821822 U | 12/2019 |
| CN | 110739661 A | 1/2020 |
| CN | 111708724 A | 9/2020 |

OTHER PUBLICATIONS

First office action for Chinese application 202010473175.X.
Second office action for Chinese application 202010473175.X.

\* cited by examiner

RESOURCE ALLOCATION METHOD AND DEVICE FOR PCIe CARD

CROSS-REFERENCE TO RELATED APPLICATIONS

This is a 35 U.S.C. 371 National Stage Patent Application of International Application No. PCT/CN2021/073479, filed Jan. 25, 2021, which claims priority to Chinese patent application No. 202010473175.X, filed on May 29, 2020, entitled "RESOURCE ALLOCATION METHOD AND DEVICE FOR PCIe CARD", each of which is hereby incorporated by reference in its entirety.

TECHNICAL FIELD

The present disclosure relates to the computer field, in particular to a resource allocation method and device for a PCIe card.

BACKGROUND

A peripheral component interconnect express (PCIe) bus is an important constituent part of a Central Processing Unit (CPU) and is commonly integrated inside the CPU, and along with improvement and development of the science and technology, the number of PCIe lanes supported by a single CPU is gradually increased to cause gradual increasing of a PCIe communication speed, and thus a server has higher and higher requirements for management and safety performance of a PCIe device. Resource management allocation and safety monitoring importantly influence the performance of the PCIe device. Usually, resource management allocation is implemented by a Basic Input Output System (BIOS), PCIe resources of the CPU are allocated by Basic Input Output System Firmware (BIOS FW) according to requirements of users, and resource allocation is performed again by modifying the BIOS FW in response to adaption to different PCIe cards, which indicates that the method is short of flexibility. Safety monitoring is implemented mainly through the BIOS and an Opening System (OS), and the BIOS and the OS will give an alarm when detecting error messages, such monitoring method is relatively single, with low security and lack of intuitiveness.

SUMMARY

In view of the above, the embodiment of the present disclosure aims at providing a resource allocation method and device for a PCIe card. By using the method of the present disclosure, usage of the 10 (Input/Output) port of a mainboard can be greatly reduced, layout and wiring of a Printed Circuit Board (PCB) are facilitated, and the method is simple to implement, the software cost is low and it is convenient for users to monitor remotely.

For the above purpose, the embodiment of the present disclosure, in one aspect, provides a resource allocation method for a PCIe card, including the following steps:
dividing allocation types of the PCIe card according to the number of lanes of the PCIe card and encoding allocation types and corresponding voltage intervals;
detecting a voltages of the PCIe card in response to the PCIe card being connected to a mainboard;
comparing the voltage with the voltage intervals, and judging in which voltage interval of the numbered corresponding voltage intervals the voltage is located; and
invoking, by the mainboard, a PCIe allocation type corresponding to the voltage interval for allocation.

According to an embodiment of the present disclosure, the step of dividing allocation types of a PCIe card according to the number of lanes of the PCIe card and encoding the allocation types and corresponding voltage intervals includes:
averagely dividing a voltage VCC of PCIe DEVICE ID pins in a mainboard which is not connected to the PCIe card into several sections corresponding to the number N of the allocation types of the PCIe card, where each section of voltage conforms to $L=VCC/N$; and
the voltage $l_n$ corresponding to the nth PCIe card allocation type belongs to a voltage interval being $L*(n-1) < l_n < L*n$.

According to an embodiment of the present disclosure, the step of detecting a voltage of a PCIe card in response to the PCIe card being connected to a mainboard includes:
the voltage is $V=VCC*R1/(R1+R2)$, where, R1 represents ground resistance of PCIe DEVICE ID pins on the PCIe card when the PCIe card is not connected to the mainboard, and R2 represents pull-up resistance of PCIe DEVICE ID pins on the mainboard when the PCIe card is not connected to the mainboard.

According to an embodiment of the present disclosure, a PCIe card is connected to a slimline connector on a mainboard through a slimline connector.

According to an embodiment of the present disclosure, the step of comparing a voltage with voltage intervals and judging in which numbered corresponding voltage interval the voltage is located includes:
converting, by an analog-digital converter, a detected voltage into a digital signal and sending, by an I2C bus, the digital signal to a baseboard management controller; and
analyzing, by the baseboard management controller, the received digital signal and judging in which numbered corresponding voltage interval the voltage is located.

The embodiment of the present disclosure, in the other aspect, further provides a resource allocation device for a PCIe card, and the device includes:
a division module configured to perform allocation type division on the PCIe card according to the number of lanes of the PCIe card, and encode allocation types and corresponding voltage intervals;
a detection module configured to detect a voltage of the PCIe card in response to the PCIe card being connected to a mainboard;
a judgment module configured to compare the voltage with the voltage intervals and judge in which the numbered corresponding voltage interval the voltage is located; and
an allocation module configured to make the mainboard invoke a PCIe allocation type corresponding to the voltage interval for allocation.

According to an embodiment of the present disclosure, a division module is further configured to:
averagely divide a voltage VCC of PCIe DEVICE ID pins in a mainboard which is not connected to a PCIe card into several sections corresponding to the number N of the allocation types of the PCIe card, where each section of voltage conforms to $L=VCC/N$; and
the voltage $l_n$ corresponding to the nth PCIe card allocation type belongs to a voltage interval being $L*(n-1) < l_n < L*n$.

According to an embodiment of the present disclosure, a detection module is further configured to:

the voltage is V=VCC*R1/(R1+R2), where, R1 represents ground resistance of PCIe DEVICE ID pins on a PCIe card when the PCIe card is not connected to a mainboard, and R2 represents pull-up resistance of PCIe DEVICE ID pins on the mainboard when the PCIe card is not connected to the mainboard.

According to an embodiment of the present disclosure, a PCIe card is connected to a slimline connector on a mainboard through a slimline connector.

According to an embodiment of the present disclosure, a judgment module is further configured in a manner:

converting, by an analog-digital converter, a detected voltage into a digital signal and sending, by an Inter-Integrated Circuit (I2C) bus being a two-line serial bus, the digital signal to a baseboard management controller; and analyzing, by the baseboard management controller, the received digital signal and judging which numbered corresponding voltage interval the voltage is located.

The present disclosure has following beneficial technical effects: in the resource allocation method for the PCIe card provided by the embodiments of the present disclosure, performing allocation type division on the PCIe card according to the number of the lanes of the PCIe card, and encoding allocation types and corresponding voltage intervals; detecting the voltage of the PCIe card in response to the PCIe card being connected to the mainboard; comparing the voltage with the voltage intervals and judging in which the numbered corresponding voltage interval the voltage is located; and invoking, by the mainboard, the PCIe allocation type corresponding to the voltage interval for allocation, thereby greatly reducing usage of a mainboard IO port, facilitating PCB layout and wiring, simply implementing the method, achieving low software costs, and being beneficial to users for achieving remote monitoring.

BRIEF DESCRIPTION OF THE DRAWINGS

In order to describe the technical solutions in the embodiments of the present disclosure or the related art more clearly, the drawings required to be used in the embodiments or the prior art will be simply introduced below, obviously, the drawings described below are only some embodiments of the present disclosure, and those ordinary skill in the art can obtain other embodiments according to the drawings without creative work.

DETAILED DESCRIPTION OF THE EMBODIMENTS

To make purposes, technical solutions and advantages of the present disclosure more clearly understood, the embodiments of the present disclosure are further described in detail by combining specific embodiments and in reference to drawings.

Figure 1:
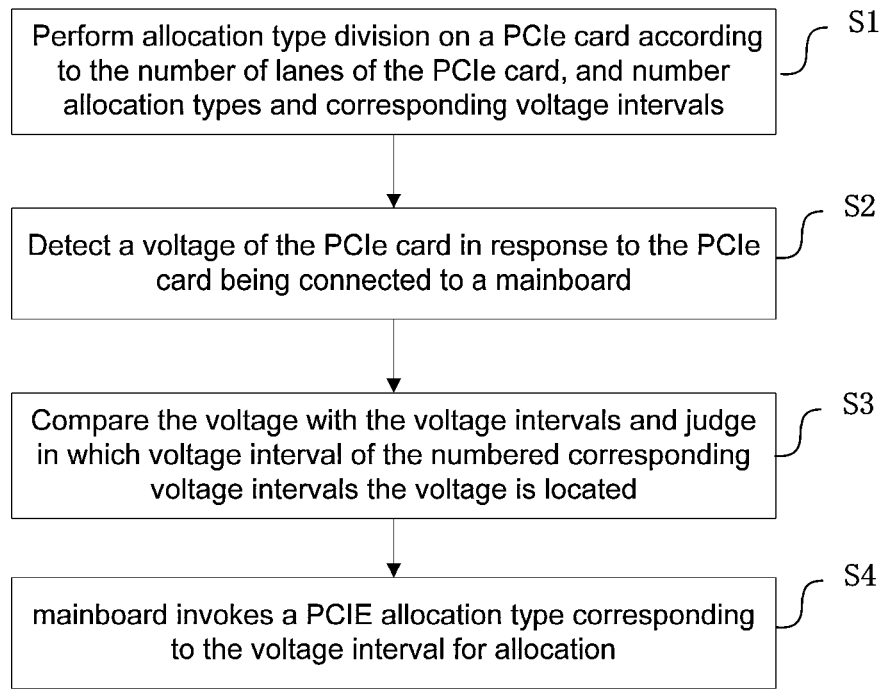
FIG. 1 is a schematic flowchart of a resource allocation method for a PCIe card according to an embodiment of the present disclosure.

Based on the above purpose, the embodiment of the present disclosure, in the first aspect, provides an embodiment of a resource allocation method for a PCIe card. FIG. 1 is a schematic flowchart of the method.

As shown in FIG. 1, the method may include the following steps:

S1: Divide allocation types of the PCIe card according to the number of lanes of the PCIe card and number the allocation types and corresponding voltage intervals, where the PCIe card is in a model of PCIe x8 and may have four allocation manners being numbered.

S2: Detect a voltage of the PCIe card in response to the PCIe card being connected to a mainboard.

S3: Compare the voltage with the voltage intervals and judge in which voltage interval of the numbered corresponding voltage intervals the voltage is located.

S4: the mainboard invokes a PCIE allocation type corresponding to the voltage interval for allocation.

By means of the technical solution of the present disclosure, usage of a mainboard IO port can be greatly reduced, layout and wiring of a PCB are facilitated, and the method is simple to implement, the software cost is low and it is convenient for users to monitor remotely.

Figure 3:
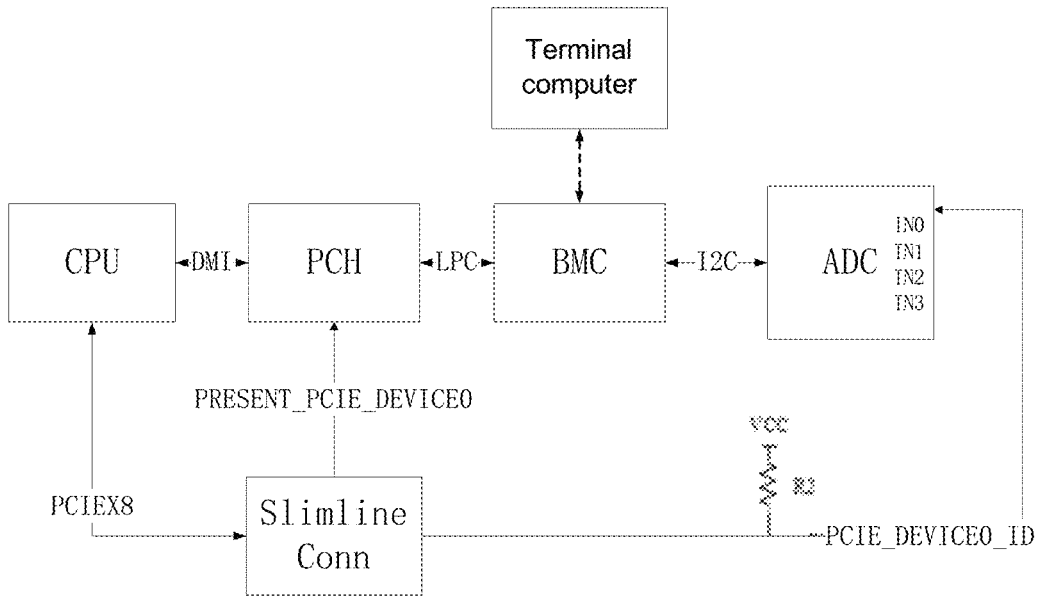
FIG. 3 is a schematic diagram of a mainboard structure according to an embodiment of the present disclosure.
Figure 4:
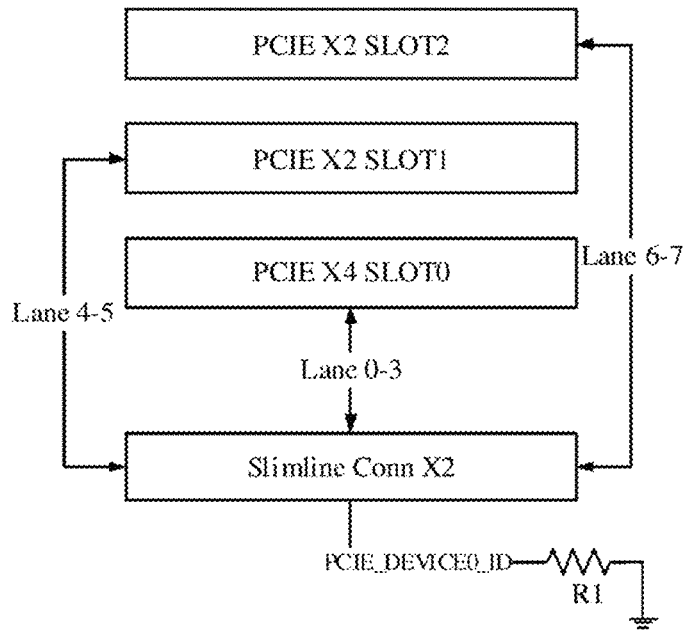
FIG. 4 is a schematic diagram of a PCIe card structure according to an embodiment of the present disclosure.

FIG. 3 is a schematic diagram of a mainboard for implementing a method of the present disclosure. The mainboard includes a platform controller hub (PCH), a baseboard management controller (BMC), an analog-digital converter (ADC) and a plurality of slimline connectors. FIG. 4 is a schematic diagram of a PCIe card, and the card includes a slimline connector and PCIe slots.

Refer to FIG. 3 and FIG. 4, at a PCIe card end, PCIe DEVICE ID pins on the slimline connector are connected to the ground through a resistor R1, and pull-down resistors R1 of PCIe ID pins of different PCIe cards are different in resistance.

At a mainboard end, a CPU communicates with the PCH through a Direct Media Interface (DMI), the PCH communicates with the BMC through a linear predictive coding (LPC) interface, the PCIe DEVICE ID pins on the slimline connectors are connected to an input lane of the analog-digital converter and pulled to a volt current condenser (VCC) through a resistor R2, and pull-up resistors R2 of the PCIe DEVICE ID pins on all the slimline connectors on the mainboard are the same in resistance.

The slimline connector on the PCIe card may be connected to any slimline connector on the mainboard through a cable.

When the PCIe card is not inserted, a voltage of the PCIe DEVICE ID pins on the slimline connector is VCC, and after the PCIe card is inserted, a level of the PCIe DEVICE ID pins is determined by VCC voltage dividing performed by the resistors R1 and R2, and a value of the voltage is: V=VCC*R1/(R1+R2).

The analog-digital converter is connected to the baseboard management controller through an I2C bus, and the analog-digital converter detects analog levels of the PCIe DEVICE ID pins of the slimline connectors on the mainboard, and transmits voltage information corresponding to the PCIe DEVICE ID to the baseboard management controller through an I2C bus protocol after converting analog signals into digital signals.

The baseboard management controller analyzes the voltage information. The voltage VCC is divided into N1 sections according to the number of PCIe lane allocation types, the length of each section is L, L=VCC/N1, the PCIe DEVICE ID and the voltage information are numbered by the baseboard management controller, and a voltage interval with the voltage corresponding to the nth PCIe lane allocation type is $L*(n-1) < l_n < L*n$, where $1 <= n <= N1$. The baseboard management controller judges the voltage interval to which the voltage of the PCIe DEVICE ID pins of the slimline connectors on the mainboard belongs, and looks up a table for obtaining the allocation type of a PCIe lane needed by the PCIe card.

The baseboard management controller is connected to the platform controller hub through an LPC bus, on one hand, the baseboard management controller transmits, by the LPC bus, allocation type information of the PCIe lane needed by the PCIe card to the platform controller hub, and the platform controller hub performs, by the BIOS, PCIe lane allocation according to the acquired information; and on the other hand, the baseboard management controller acquires the number of PCIe cards, corresponding bus bandwidths and other information from BIOS POST information. The baseboard management controller performs contrastive analysis on the information and information obtained by analysis according to the voltage of the PCIe DEVICE ID pins of the slimline connectors on the mainboard, displays an analysis result on a terminal computer through a network, and achieves the intelligent monitoring of the PCIe card.

In an embodiment of the present disclosure, the step of performing allocation type division on a PCIe card according to the number of lanes of the PCIe card, and numbering allocation types and corresponding voltage intervals includes:

Averagely divide a voltage VCC of PCIe DEVICE ID pins in a mainboard which is not connected to the PCIe card into several sections corresponding to the number N of the allocation types of the PCIe card, and the voltage of each section is L=VCC/N; and the voltage $l_n$ corresponding to the nth PCIe card allocation type belongs to a voltage interval being $L*(n-1) < l_n < L*n$.

For example, the PCIe card is in a model of PCIe X8 and has four allocation manners shown in the following Table 1:

TABLE 1

PCIe card allocation types

| Serial number | Allocation type |
|---|---|
| 1 | 8x PCIe x1 |
| 2 | 2x PCIe x4 |
| 3 | 1x PCIe x4 + 2x PCIe x2 |
| 4 | 1x PCIe x4 + 1x PCIe x2 + 2x PCIe x1 |

The number of PCIe lane allocation types is four, so that voltage VCC is divided into 4 sections, a voltage of each section is L, L=VCC/4, a baseboard management controller numbers PCIe DEVICE0 ID and voltage information, a voltage interval with the voltage corresponding to the nth PCIe lane allocation type is $L*(n-1) < l_n < L*n$, where $1 <= n <= 4$, and the baseboard management controller judges the interval to which the voltage of PCIe DEVICE0 ID pins of the slimline connectors on the mainboard belongs, obtains the allocation type of the PCIe lane needed by the PCIe card through look-up the table.

In an embodiment of the present disclosure, the step of detecting a voltage of a PCIe card in response to the PCIe card being connected to a mainboard includes:

Make the voltage be V=VCC*R1/(R1+R2), where, R1 represents a ground resistor of PCIe DEVICE ID pins on the PCIe card when the PCIe card is not connected to the mainboard, and R2 represents a pull-up resistor of PCIe DEVICE ID pins on the mainboard when the PCIe card is not connected to the mainboard.

In an embodiment of the present disclosure, a PCIe card is connected to a slimline connector on a mainboard through a slimline connector.

In an embodiment of the present disclosure, the step of comparing a voltage with voltage intervals and judging which voltage interval of the numbered corresponding voltage intervals the voltage is located includes:

an analog-digital converter converts the detected voltage into a digital signal and an I2C bus sends the digital signal to a baseboard management controller.

the baseboard management controller analyzes the received digital signal and judge in which voltage interval of the numbered corresponding voltage intervals the voltage is located.

By means of the technical solution of the present disclosure, usage of a mainboard 10 port can be greatly reduced, layout and wiring of a PCB are facilitated, and the method is simple in implementation, low in software cost and beneficial to users for achieving remote monitoring.

It is to be noted that ordinary skill in the art may understand about all or part of processes for implementing the methods of the above embodiments being completed by commanding, by computer programs, related hardware, the programs may be stored in a computer-readable storage medium, and when performed, the programs may include the processes of the embodiments of the above methods. The storage medium may be a diskette, a light disk, a Read-Only Memory (ROM) or a Random Access Memory (RAM), or the like. The embodiments of the above computer programs may achieve effects the same with or similar to the embodiment of any previous method.

In addition, the method disclosed according to the embodiment of the present disclosure may be implemented by computer programs executed by the CPU, and the computer programs may be stored in the computer-readable storage medium. The computer programs are executed by the CPU to execute the above functions limited in the method disclosed according to the embodiment of the present disclosure.

Figure 2:
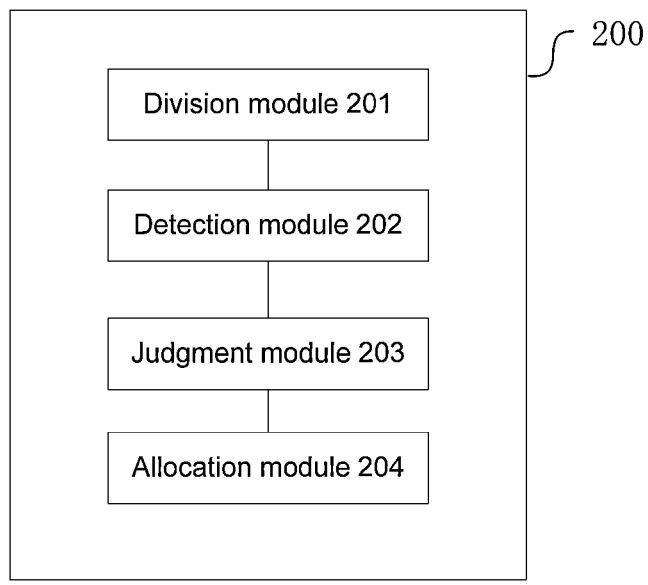
FIG. 2 is a schematic diagram of a resource allocation device for a PCIe card according to an embodiment of the present disclosure.

Based on the above purpose, the embodiment of the present disclosure, in the second aspect, provides a resource allocation device for a PCIe card, and as shown in FIG. 2, the device 200 includes:

a division module configured to perform allocation type division on the PCIe card according to the number of lanes of the PCIe card, and numbers allocation types and corresponding voltage intervals;

a detection module configured to detect a voltage of the PCIe card in response to the PCIe card being connected to a mainboard;

a judgment module configured to compare the voltage with the voltage intervals and judge in which voltage interval of the numbered corresponding voltage intervals the voltage is located; and an allocation module configured to invoke, through a mainboard, a PCIe allocation type corresponding to the voltage interval for allocation.

In an embodiment of the present disclosure, a division module is further configured to:

averagely divide a voltage VCC of PCIe DEVICE ID pins in a mainboard which is not connected to a PCIe card into several sections corresponding to the number N of allocation types of the PCIe card, wherein the voltage of each section is L=VCC/N; and the voltage $l_n$ corresponding to the nth PCIe card allocation type belongs to a voltage interval being $L*(n-1) < l_n < L*n$.

In an embodiment of the present disclosure, a detection module is further configured to:
make the voltage be $V=VCC*R1/(R1+R2)$, where, R1 represents a ground resistor of PCIe DEVICE ID pins on the PCIe card when the PCIe card is not connected to the mainboard, and R2 represents a pull-up resistor of PCIe DEVICE ID pins on the mainboard when the PCIe card is not connected to the mainboard.

In an embodiment of the present disclosure, a PCIe card is connected to a slimline connector on a mainboard through a slimline connector.

In an embodiment of the present disclosure, a judgment module is further configured to:
convert, through an analog-digital converter, a detected voltage into a digital signal and send, through an I2C bus, the digital signal to a baseboard management controller; and
analyze, through the baseboard management controller, the received digital signal and judge in which voltage interval of the numbered corresponding voltage intervals the voltage is located.

It needs to be particularly indicated that the embodiments of the above system adopt the embodiments of the above method to specifically describe work processes of various modules, and those skill in the art easily think of applying the modules to other embodiments of the above method.

In addition, the above method steps and system units or modules may be implemented by the controller and the computer-readable storage medium configured to store the computer programs making the controller implement the above steps or unit or module functions.

Those skill in the art will understand that various exemplary logical blocks, modules, circuits and algorithm steps described by the present disclosure may be implemented by electronic hardware, computer software or combination of the electronic hardware and the computer software. To clearly describe interchangeability of the hardware and the software, functions of various schematic modules, square blocks, modules, circuits and steps are generally described. The functions being implemented by the software or the hardware is decided by specific applications and design constraints applied to the whole system. Those skill in the art may adopt various manners to achieve the functions according to each specific application, but the implementation decision should not be explained as causing departing from the scope disclosed by the embodiment of the present disclosure.

The above embodiments, particularly any exemplary embodiments are possible examples for implementation and are proposed only to make the principle of the present disclosure clearly understood. The above embodiments may be variously changed and modified without departing from the spirit and the principle of the technology described by the Description. All modifications aim to be included in the scope of the present disclosure and protected by attached claims.

What is claimed is:

1. A resource allocation method for a PCIe card, comprising:
performing allocation type division on the PCIe card according to a number of lanes of the PCIe card, and numbering allocation types and corresponding voltage intervals;
detecting a voltage of the PCIe card in response to the PCIe card being connected to a mainboard;
comparing the voltage with the voltage intervals and judging in which voltage interval of the numbered corresponding voltage intervals the voltage is located; and
invoking, by the mainboard, the PCIe allocation type corresponding to the voltage interval for allocation;
wherein the operation of performing allocation type division on the PCIe card according to the number of lanes of the PCIe card, and numbering allocation pes and corresponding voltage intervals comprises:
averagely dividing a voltage VCC of PCIe DEVICE ID pins in the mainboard which is not connected to the PCIe card into several sections corresponding to a number N of the allocation types of the PCIe card, the voltage of each section being: $L=VCC/N$, and the voltage $l_n$ corresponding to the nth PCIe card allocation type belonging to a voltage interval being $L*(n-1) < l_n < L*n$.

2. The method according to claim 1, wherein the operation of detecting a voltage of the PCIe card in response to the PCIe card being connected to the mainboard comprises:
the voltage being $V=VCC*R1/(R1+R2)$, wherein, R1 represents a ground resistor of PCIe DEVICE ID pins on the PCIe card when the PCIe card is not connected to the mainboard, and R2 represents a pull-up resistor of PCIe DEVICE ID pins on the mainboard when the PCIe card is not connected to the mainboard.

3. The method according to claim 1, wherein the PCIe card is connected to a slimline connector on the mainboard through a slimline connector.

4. The method according to claim 1, wherein the operation of comparing a voltage with the voltage intervals and judging in which voltage interval of the numbered corresponding voltage intervals the voltage is located comprises:
converting, by an analog-digital converter, a detected voltage into a digital signal and sending, by an I2C bus, the digital signal to a baseboard management controller; and
analyzing, by the baseboard management controller, the received digital signal and judging in which voltage interval of the numbered corresponding voltage intervals the voltage is located.

5. A resource allocation device for a PCIe card, comprising one or more processors configured to execute a computer program, and upon execution of the computer program, the one or more processors are configured to:
perform allocation type division on the PCIe card according to a number of lanes of the PCIe card, and number allocation types and corresponding voltage intervals;
detect a voltage of the PCIe card in response to the PCIe card being connected to a mainboard;
compare the voltage with the voltage intervals and judge in which voltage interval of the numbered corresponding voltage intervals the voltage is located; and
invoke, via the mainboard, a PCIe allocation type corresponding to the voltage interval for allocation,
wherein the one or more processor are further configured to:
averagely divide a voltage VCC of PCIe DEVICE ID pins in the mainboard which is not connected to the PCIe card into several sections corresponding to a number N of the allocation types of the PCIe card, the voltage of each section being: $L=VCC/N$, and the voltage $l_n$ corresponding to the nth PCIe card allocation type belonging to a voltage interval being $L*(n-1) < l_n < L*n$.

6. The device according to claim 5, wherein the voltage is V=VCC*R1/(R1+R2), R1 represents a ground resistor of PCIe DEVICE ID pins on the PCIe card when the PCIe card is not connected to the mainboard, and R2 represents a pull-up resistor of PCIe DEVICE ID pins on the mainboard when the PCIe card is not connected to the mainboard.

7. The device according to claim 5, wherein the PCIe card is connected to a slimline connector on the mainboard through a slimline connector.

8. The device according to claim 5, wherein the one or more processors are further configured to:
  convert, through an analog-digital converter, the detected voltage into a digital signal and send, through an I2C bus, the digital signal to a baseboard management controller; and
  analyze, through the baseboard management controller, the received digital signal and judge in which voltage interval of the numbered corresponding voltage intervals the voltage is located.

9. The device according to claim 5, wherein the device further comprises the PCIe card and the mainboard, and the PCIe card is connected to a slimline connector on the mainboard through a slimline connector on the PCIe card.

10. The device according to claim 9, wherein the mainboard comprises:
  an analog-digital converter, configured to convert the detected voltage into a digital signal and send, through an I2C bus, the digital signal to a baseboard management controller; and
  a baseboard management controller, configure to analyze the received digital signal and judge in which voltage interval of the numbered corresponding voltage intervals the voltage is located, and obtain the allocation type.

11. The device according to claim 10, wherein the mainboard further comprises:
  a platform controller hub, configured to performs PCIe lane allocation according to the PCIe allocation type.

12. The device according to claim 11, wherein the baseboard management further comprises:
  a CPU, configured to communicates with the platform controller hub through a Direct Media Interface (DMI).

13. The device according to claim 9, wherein the PCIe card comprises multiple PCIe slots.

14. The device according to claim 9, wherein the PCIe allocation type comprises at least one of the following: 8×PCIe x1, 2×PCIe x4, 1×PCIe x4+2×PCIe x2, 1×PCIe x4+1×PCIe x2+2×PCIe x1.

15. The device according to claim 9, wherein PCIe DEVICE ID pins of the slimline connector on the PCIe card are connected to ground through a ground resistor.

16. The device according to claim 15, wherein different PCIe cards correspond to different ground resistors with different resistance.

17. The device according to claim 9, wherein PCIe DEVICE ID pins of the slimline connector on the mainboard are connected to an input lane of the analog-digital converter, and being pulled to a volt current condenser (VCC) through a pull-up resistor.

18. The device according to claim 17, wherein all the pull-up resistors have the same resistance.

* * * * *